(12) United States Patent
Prakash et al.

(10) Patent No.: US 7,519,565 B2
(45) Date of Patent: Apr. 14, 2009

(54) METHODS AND APPARATUSES FOR CLASSIFYING ELECTRONIC DOCUMENTS

(75) Inventors: Vipul Ved Prakash, San Francisco, CA (US); Mark Stemm, San Francisco, CA (US)

(73) Assignee: Cloudmark, Inc., San Francisco, CA (US)

( * ) Notice: Subject to any disclaimer, the term of this patent is extended or adjusted under 35 U.S.C. 154(b) by 404 days.

(21) Appl. No.: 10/877,735

(22) Filed: Jun. 24, 2004

(65) Prior Publication Data

US 2005/0097435 A1 May 5, 2005

Related U.S. Application Data

(60) Provisional application No. 60/517,010, filed on Nov. 3, 2003.

(51) Int. Cl.
*G06N 5/00* (2006.01)

(52) U.S. Cl. ......................................... 706/20; 707/101

(58) Field of Classification Search ................. 706/20; 382/225; 701/45; 702/19; 707/5, 6, 3, 101; 709/206, 224

See application file for complete search history.

(56) References Cited

U.S. PATENT DOCUMENTS

| | | | | |
|---|---|---|---|---|
| 6,141,686 A * | 10/2000 | Jackowski et al. | ........... | 709/224 |
| 6,161,130 A * | 12/2000 | Horvitz et al. | ............... | 709/206 |
| 6,192,360 B1 * | 2/2001 | Dumais et al. | .................. | 707/6 |
| 6,393,427 B1 | 5/2002 | Vu et al. | | |
| 6,459,974 B1 * | 10/2002 | Baloch et al. | .................. | 701/45 |
| 6,553,365 B1 | 4/2003 | Summerlin et al. | | |
| 6,563,952 B1 * | 5/2003 | Srivastava et al. | ........... | 382/225 |
| 6,647,341 B1 * | 11/2003 | Golub et al. | ................... | 702/19 |
| 6,901,398 B1 * | 5/2005 | Horvitz et al. | .................. | 707/5 |
| 6,941,321 B2 | 9/2005 | Schuetze et al. | | |
| 6,952,700 B2 * | 10/2005 | Modha et al. | ................ | 707/101 |

(Continued)

FOREIGN PATENT DOCUMENTS

WO WO-2005043416 A3 5/2005

OTHER PUBLICATIONS

PCT Notification of Transmittal of the International Search Report and the Written Opinion of the International Searching Authority, or the Declaration, PCT/US2004/036759, 19 pages.

(Continued)

*Primary Examiner*—Wilbert L Starks, Jr.
(74) *Attorney, Agent, or Firm*—Schwegman, Lundberg & Woessner, P.A.

(57) ABSTRACT

Embodiments of the invention provide methods and apparatuses for classifying electronic documents (e.g., electronic communications) as either spam electronic documents or legitimate electronic documents. In accordance with one embodiment of the invention, each of a plurality of electronic communications is reduced to a corresponding multidimensional vector based on a multi-dimensional vector space. The multi-dimensional vectors represent corresponding electronic documents that have been classified as at least one type of electronic documents. Subsequent electronic documents to be classified are reduced to a corresponding multi-dimensional vector inserted into the multi-dimensional vector space. The electronic documents corresponding to an inserted multi-dimensional vector are classified based upon the proximity of the inserted multi-dimensional vector to at least one previously classified multi-dimensional vectors of the multi-dimensional vector space.

84 Claims, 6 Drawing Sheets

U.S. PATENT DOCUMENTS

| | | | |
|---|---|---|---|
| 7,158,983 B2* | 1/2007 | Willse et al. | 707/101 |
| 7,194,483 B1 | 3/2007 | Mohan et al. | |
| 7,216,129 B2 | 5/2007 | Aono et al. | |
| 7,272,593 B1* | 9/2007 | Castelli et al. | 707/3 |
| 7,363,311 B2 | 4/2008 | Fujita et al. | |
| 2003/0187845 A1 | 10/2003 | Kayahara | |
| 2005/0021997 A1 | 1/2005 | Beynon et al. | |
| 2005/0022106 A1 | 1/2005 | Kawai et al. | |
| 2005/0149546 A1 | 7/2005 | Prakash et al. | |
| 2005/0164273 A1 | 7/2005 | Stoughton et al. | |
| 2005/0282193 A1 | 12/2005 | Bulyk et al. | |
| 2006/0253258 A1 | 11/2006 | Miyake | |

OTHER PUBLICATIONS

PCT Invitation to Pay Additional Fees, PCT/US2004/036759, 6 pages.

Yongchong, Li, et al., "Classification of text documents," IEEE Comput. Soc., Pattern Recognition, vol. 2, Aug. 16, 1998, pp. 1295-1297.

Dudani, Sahibsingh A., "The Distance-Weighted k-Nearest-Neighbor Rule," IEEE Transactions on Systems, vol. SMC-6, No. 4, Apr. 1976, pp. 325-327.

MacLeod, James E. S., et al., "The Re-Examination of the Distance-Weighted k-Nearest Neighbor Classification Rule," IEEE Transaction on Systems, vol. SMC-17, No. 4, Aug. 1987, pp. 689-696.

"U.S. Appl. No. 10/979,604 Non-Final Office Action mailed Apr. 16, 2007", 35 pgs.

"U.S. Appl. No. 10/979,604, Response filed Sep. 19, 2007 to Non-Final Office Action mailed Apr. 16, 2007", 22 pages.

"U.S. Appl. No. 10/979,604 Final Office Action mailed Jul. 7, 2008", 23 pgs,

* cited by examiner

METHODS AND APPARATUSES FOR CLASSIFYING ELECTRONIC DOCUMENTS

CLAIM OF PRIORITY

This application is related to, and hereby claims the benefit of provisional application No. 60/517,010, entitled "Unicorn Classifier," which was filed Nov. 3, 2003 and which is hereby incorporated by reference.

FIELD

Embodiments of the invention relate generally to the field of electronic documents, and more specifically to methods and apparatuses for classifying such documents.

BACKGROUND

Electronic documents can be classified in many ways. Classification of electronic documents (e.g., electronic communications) may be based upon the contents of the communication, the source of the communication, and whether or not the communication was solicited by the recipient, among other criteria. For example, electronic communications may be classified as spam. Whether or not an electronic communication is spam is based upon the subjective opinion of the recipient, though generally spam is any unsolicited, non-consensual, electronic communication, typically of a commercial nature, and usually transmitted in bulk to many recipients. Spam includes unsolicited commercial e-mail (UCE), unsolicited bulk e-mail (UBE), gray mail, and just plain "junk mail," and is typically used to advertise products.

Receiving and addressing spam is costly and annoying, so considerable effort is being made to detect spam and prevent its delivery to the intended recipient.

One prior art scheme for spam detection involves application of a rules-based filtering system. Such rules may be based on terms within the communication. For example, if the subject line of the communication includes the term "make money," the communication may be determined to be spam. Such rules may also be based upon the absence of information. For example, if a communication does not identify the sender, the communication may be determined to be spam.

Such schemes, while somewhat successful in determining spam, have several serious drawbacks. For example, such schemes usually employ hundreds or thousands of rules, each of which is formulated independently. The cost of developing such rules is prohibitive. Also, because each received electronic communication has to be validated against the myriad of rules, such schemes require expensive hardware to support the intensive computation that such validation requires. Moreover, spam senders are adept at changing the spam to avoid detection by such rules.

Another prior art scheme for detecting spam includes the use of statistical classifiers (e.g., a Bayesian classifier) that determine an electronic communication is spam based upon an analysis of words that occur frequently in spam. Such statistical classifier-based schemes can be defeated by various methods known to producers of spam (spammers). For example, spammers may encode the body of an electronic communication to avoid detection based upon words within the electronic communication.

More sophisticated statistical classifiers have recently been developed that classify communications based upon structural attributes of the communication. Such schemes, while addressing some of the drawbacks of previous statistical classification schemes, also have disadvantages in regard to computational resources.

Still another prior art scheme involves using the classification analysis of a community of users in order to classify electronic communications. In such a scheme, a number of users would identify a particular communication as spam. When the number of users identifying the particular communication as spam reached a specified threshold, the communication would be determined to be spam. This type of user-feedback classification scheme has disadvantages in terms of the length of time it takes to classify a communication.

BRIEF DESCRIPTION OF THE DRAWINGS

The invention may be best understood by referring to the following description and accompanying drawings that are used to illustrate embodiments of the invention. In the drawings.

DETAILED DESCRIPTION

Overview

Embodiments of the invention provide methods and apparatuses for classifying electronic documents (e.g., electronic communications). In accordance with one embodiment of the invention, each of a plurality of electronic communications is reduced to a multidimensional vector (MDV) based on an MDV space. The MDVs represent the corpus of electronic documents that have been previously classified into one of a number of classifications. Subsequent electronic documents to be classified are reduced to a corresponding MDV and inserted into the MDV space. The electronic document corresponding to an inserted MDV is classified based upon the proximity of the inserted MDV to at least one previously classified MDVs of the MDV space.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Process

Figure 1:
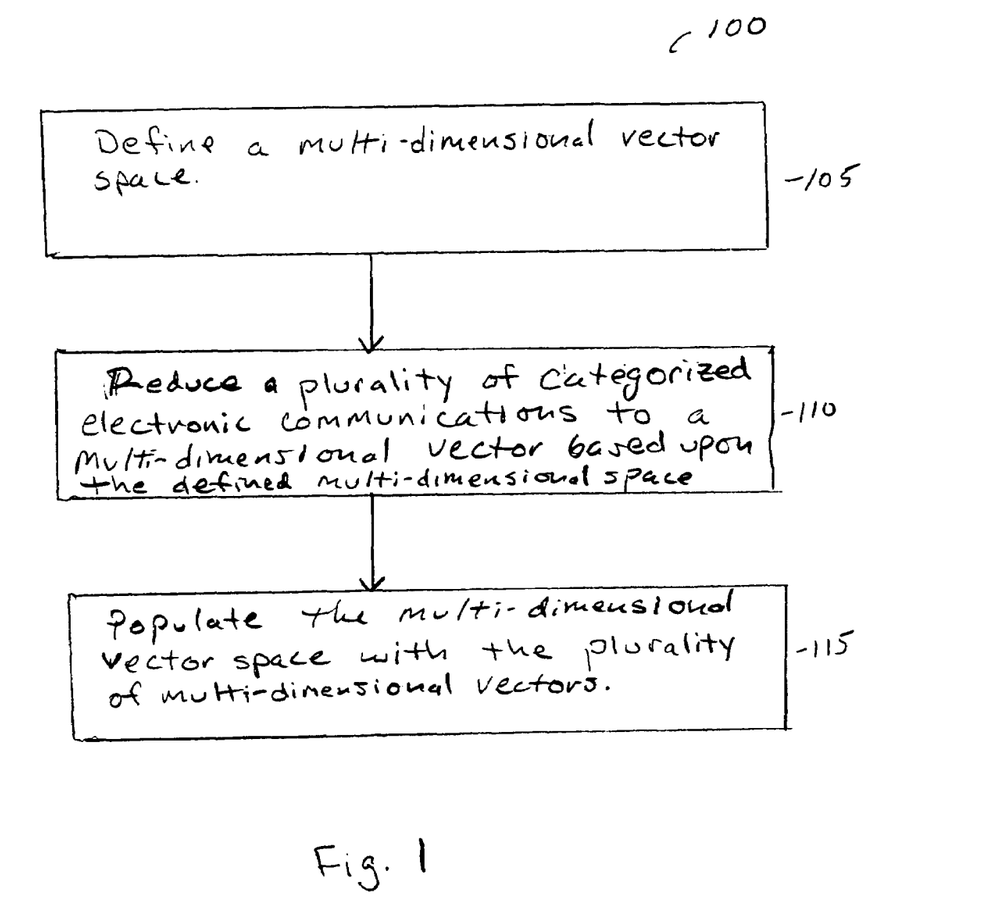
FIG. 1 illustrates a process in which electronic communications are reduced to corresponding multi-dimensional vectors based upon a defined multi-dimensional vector space in accordance with one embodiment of the invention.

FIG. 1 illustrates a process in which electronic documents are reduced to corresponding MDVs based upon a defined MDV space in accordance with one embodiment of the invention. Process 100, shown in FIG. 1, begins at operation 105 in which an MDV space is defined. The MDV space is defined by a plurality of features. Features may be of various types including words and or phrases contained within the body or header of the electronic documents. Features may also include electronic document genes. Such genes are defined as arbitrary functions that take the message as input and return a true/false value as output. Such functions can be inserted or modified as necessary and can use external information as additional inputs in determining a return value.

Domains of any hyperlinks found in the electronic documents may also be used as features as can domains present in the electronic document header. Additionally, the result of genes that operate on the header of the electronic document may be features. For one embodiment, the number of features includes approximately 5,000 words and phrases, 500 domain names and host names, and 300 genes.

Features can originate from various sources in accordance with alternative embodiments of the invention. For example, features can originate through initial training runs or user initiated training runs, or may originate through the runtime feature extractor as discussed in more detail below. In accordance with alternative embodiments, feature attributes may be stored for each feature. Such attributes may include a numerical ID that is used in the vector representation, feature type (e.g., 'word', 'phrase', 'gene', 'domain'), feature source, the feature itself, or the category frequency for each of a number of categories. In accordance with one embodiment, the features may be selected based on their ability to effectively differentiate between communication categories or classifications. This provides features that are better able to differentiate between classifications.

Figure 2:
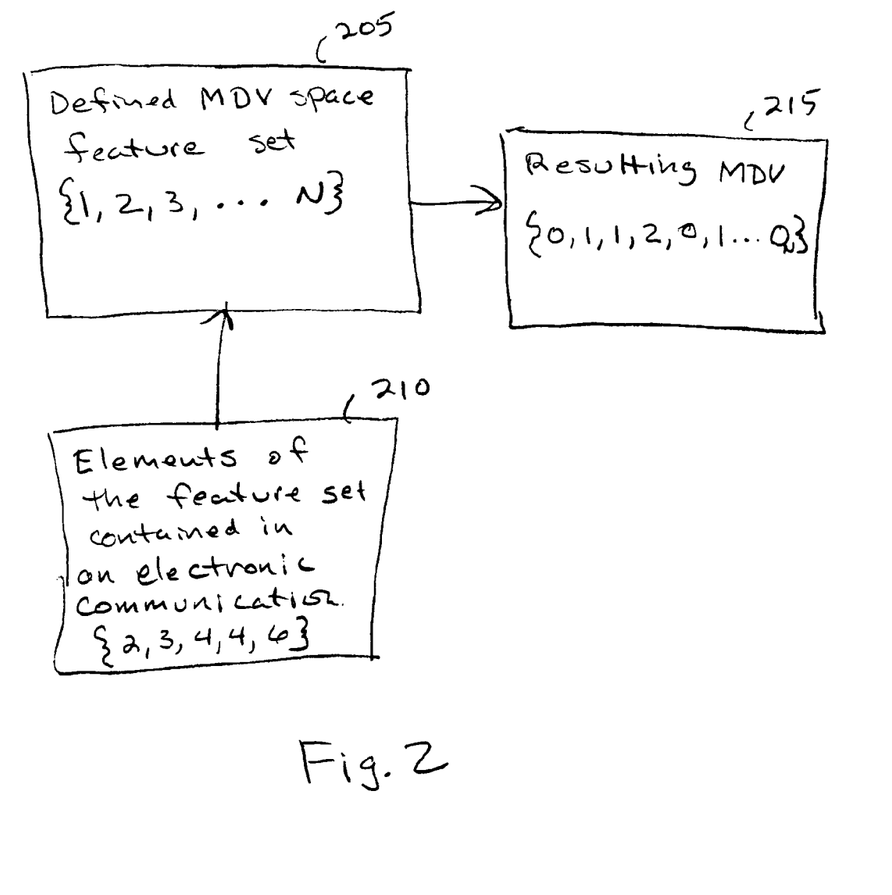
FIG. 2 illustrates the reduction of a single electronic communication to a multi-dimensional vector based upon a defined multi-dimensional vector space in accordance with one embodiment of the invention.

FIG. 2 illustrates the reduction of a single electronic document to an MDV based upon a defined MDV space in accordance with one embodiment of the invention. As shown in FIG. 2, the defined MDV space feature set 205 includes features 1-N. The electronic document that is to be reduced to an MDV contains one occurrence each of features 2, 3, and 6, and two occurrences of feature 4.

The resulting MDV 215 is $\{0_1, 1_2, 1_3, 2_4, 0_5, 1_6, 0_7, 0_8, \ldots 0_N\}$. The resulting MDV reflects which of the features that define the MDV space are present in the corresponding electronic communication, as well as the frequency with which each feature appears in that electronic communication. The resulting MDV has a zero element for each feature that does not appear in the corresponding electronic communication.

For one embodiment of the invention, each feature is weighted depending on the frequency of occurrence of the feature in the one or more electronic documents relative to the frequency of occurrence of each other feature in the at one or more electronic documents (term weight). For one embodiment of the invention, the feature may be weighted depending on the probability of the feature being present in an electronic document of a particular category (category weight). Alternatively, the feature may be weighted using a combination of term weight and category weight. Feature weighting emphasizes features that are rare and that are good spam/legit differentiators over features that are relatively common and that occur approximately equally often in spam and legit documents.

For one embodiment, the feature weights are used to scale the values of each MDV along their respective dimensions. For example, if a MDV was originally $\{0_1, 0_2, 1_3, 3_4, 4_5, 0_6, 0_7, 0_8, \ldots 0_N\}$, and the feature weights are $(1.1_1, 1_2, 3.2_3, 2.5_4, 0.5_5, 0_6, 0_7, 0_8, \ldots 0_N)$, then for purposes of determining distance, as described below, the MDV is assumed to be $\{0_1, 0_2, 3.2_3, 7.5_4, 2_5, 0_6, 0_7, 0_8, \ldots 0_N\}$, At operation 110, a training set of electronic documents are reduced to MDVs based upon the defined MDV space. For one embodiment, the electronic documents are electronic communications such as e-mail messages (e-mails). For alternative embodiments the electronic documents may be other types of electronic communications including any type of electronic message including voicemail messages, short messaging system (SMS) messages, multi-media service (MMS) messages, facsimile messages, etc., or combinations thereof. Some embodiments of the invention extend beyond electronic communications to the broader category of electronic documents.

For one embodiment, each of the electronic communications of the training set is classified into one of a number of classifications. For example, each of the electronic communications of the training set may be classified as spam e-mail or legitimate e-mail for one embodiment. A spam electronic document is herein broadly defined as an electronic document that a receiver does not wish to receive, while a legitimate electronic document is defined as an electronic document that a receiver does wish to receive. Since the distinction between spam electronic documents and legitimate electronic documents is subjective and user-specific, a given electronic document may be a spam electronic document in regard to a particular user or group of users and may be a legitimate electronic document in regard to other users or groups of users.

At operation 115, the MDVs created from the electronic documents are used to populate the defined MDV space.

For one embodiment, the process of reducing a training set of electronic documents to MDVs includes identifying the features that comprise the MDV space and transforming emails into MDVs within that space. For one such embodiment, features are identified by evaluating a set of electronic documents (training set), each of which has been classified (e.g., classified as either spam e-mails or legitimate e-mails). The frequency with which each particular feature (e.g., word, phrase, domain, etc.) appears in the training set is then determined. The frequency with which each particular feature appears in each category of electronic communication is also determined. For one embodiment, a table that identifies these frequencies is created. From this information, features that occur often and are also good differentiators (i.e. occur predominantly in a particular category of electronic communication) are determined. For example, commonly occurring features that occur predominantly in spam e-mails (spam word features) or occur predominantly in legitimate e-mails (legit word features) can be determined. Legitimate e-mails are defined, for one embodiment, as non-spam emails. These features are then selected as features of the MDV space. For one embodiment, the MDV space is defined by a set of features including approximately 2,500 spam word features and 2,500 legit word features. For one such embodiment, the MDV space is defined, additionally, by one feature for every gene. Each electronic document of the training set is then reduced to an MDV in the defined MDV space by counting the frequency of the word features in the document and applying each gene to the document. The resulting MDV is then added to the vector space.

The resulting MDV is stored as a sparse matrix (i.e., most of the elements are zero). As will be apparent to those skilled in the art, although described as multi-dimensional, each MDV may contain as few as one non-zero element.

In accordance with one embodiment, a part of the MDV space is retained for features that originate through the runtime feature extractor.

Classification and Nearest-Neighbor Selection

In accordance with one embodiment of the invention, a defined and populated MDV space can be used to classify electronic documents. A to-be-classified electronic document (subject electronic communication (SEC)) is reduced to an MDV based upon the defined MDV space and compared with the MDVs populating the MDV space. Proximity of the MDV resulting from the SEC (subject MDV) to one or more MDVs of the MDV space leads to a determination that the SEC is of the same category (e.g., spam or legit) as the one or more MDVs that are most proximate to the subject MDV.

Figure 3A:
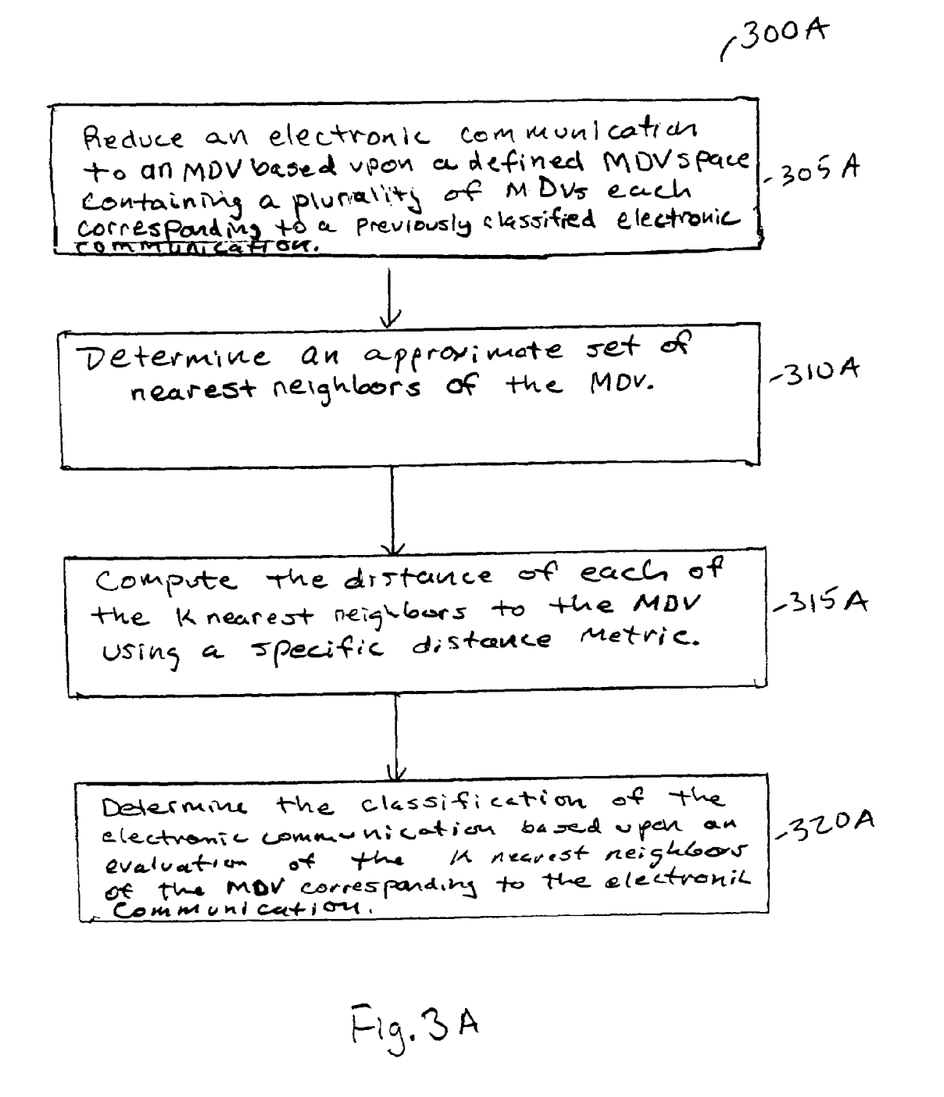
FIG. 3A illustrates a process in which an electronic communication is classified in accordance with one embodiment of the invention.

FIG. 3A illustrates a process in which an electronic communication is classified in accordance with one embodiment of the invention. Process 300A, shown in FIG. 3A, begins at operation 305A in which a SEC is reduced to a subject MDV based upon the MDV space as described above in reference to reducing a training set of electronic communications to MDVs. The MDV space containing a number of MDVs, each corresponding to a previously classified electronic communication.

At operation 310A, an approximate set of proximate MDVs is determined. That is, for one embodiment, an approximate set of nearest neighbor (ASNN) MDVs is determined and then further narrowed to k nearest neighbors (KNNs) as described below in reference to operation 320A. Conventional KNN-based classifiers find a set of nearest neighbors based on some distance metric by finding the distance of the target data point from the training dataset and finding the class from those nearest neighbors by some voting mechanism. However, the number of points in MDV space may be large and determining a distance based upon a specific distance metric may be computationally prohibitive. Therefore, for one embodiment of the invention, an ASNN MDVs is determined.

For one embodiment of the invention, the determination of an ASNN MDV is effected by partitioning the MDV space into regions and determining which region contains the KNNs of the subject MDV. For such an embodiment, the MDV space may be partitioned using a leader/follower process. Such a process includes randomly selecting a number of "leader" MDVs from within the MDV space; calculating the distance between each leader MDV and all of the remaining MDVs in the MDV space; and assigning each of the remaining MDVs to the closest leader MDV. Each leader MDV and all of the remaining MDVs are assigned to that leader (follower MDVs) form a region of the MDV space.

At operation 315A, the distance between the subject MDV and each of the MDVs of the ASNN MDVs is computed using a specific distance metric. For various alternative embodiments of the invention, any one of several specific distance metrics may be used. For example, a percentage of common dimensions distance metric in which the distance between two MDVs is proportional to the number of non-zero dimensions which the two MDVs have in common; a Manhattan distance metric in which the distance between two MDVs is the sum of the differences of the feature values of each MDV; and a Euclidean distance metric in which the distance between two MDVs is the length of the segment joining two vectors in the MDV space.

For one embodiment of the invention, a cosine similarity distance metric is used. A cosine similarity distance metric computes the similarity between two MDVs based upon the angle (through the origin) between the two MDVs. That is, the smaller the angle between two MDVs, the more similar the two MDVs are.

At operation 320A, each of the nearest neighbors of the ASNN MDVs is ordered by distance and the KNNs are evaluated. The number, k, of nearest neighbors may vary for alternative embodiments. For one embodiment, thresholding may be used to consider only neighbors that are within a threshold distance to the subject MDV. For one embodiment, the classification of the SEC is determined by a vote among the KNNs (e.g., if k=5 and 3 neighbors are in category S, then the classification of the new point is S). Or, for example, if the electronic communications corresponding to all (or most) of the k nearest neighbor MDVs were classified as spam, then the SEC would be classified as spam.

For one embodiment of the invention, the votes accorded each nearest neighbor are scaled based upon various criteria. For example, votes may be scaled based on the distance between the neighbor and the subject MDV (with nearer (more similar) neighbors receiving more votes).

For one alternative embodiment, the voting process described above, in reference to operation 320A, may not be required, and the distance between the subject MDV and each of the MDVs of the ASNN MDVs need not be computed as described above in reference to operation 315A. The distance computation may be terminated prior to determining the distance for each of the MDVs of the ASNN MDVs, if an MDV of the ASNN MDVs, is determined to be so near (similar) to the subject MDV that there is no justification in proceeding with the distance computation process and voting as described above. For example, if an MDV of the ASNN MDVs was completely similar to a subject MDV (i.e., the distance between them was zero), the subject MDV would be classified based upon the classification of the electronic communication corresponding to the completely similar MDV.

For one embodiment, a threshold is specified. If the distance is below the specified threshold level the evaluation process is halted and the SEC is classified based upon the very proximate MDV.

Additionally, or alternatively, a second threshold may be specified. If, during the operation of computing the distance between the subject MDV and each of the MDVs of the ASNN MDVs, a specified number of the nearest neighbors are within the second specified threshold, the operation of computing the distance between the subject MDV and each of the MDVs of the ASNN MDVs is halted. At this point, the specified number of the nearest neighbors that are within the second specified threshold are deemed to be the KNNs and are evaluated as described above in reference to operation 320A.

As described above, a single MDV that is within a specified threshold distance to the subject MDV may negate the need for completing the distance computation process and KNN voting. A specified number of MDVs that are within a second (somewhat greater) distance may negate the need for completing the distance computation process, but may still be subject to an evaluation process (e.g., a vote among the KNNs). By the same token, each of the KNNs of the subject MDV may be so distant that no valid conclusion as to classification can be drawn. This may render the KNN voting futile as well. For example, if none of the MDVs of the ASNN MDVs are within a specified distance of the subject MDV, then basing a classification on the KNNs may produce an erroneous classification, or at least dramatically lower the confidence in the classification.

For one embodiment of the invention, a distance threshold is specified. If there is no MDV within the distance threshold (i.e., an MDV similar enough to the subject MDV on which to confidently base a classification), then a fallback classification process is used. Such fallback classification processes may include conventional statistical classification schemes or other classification methods as known in the art.

Figure 3B:
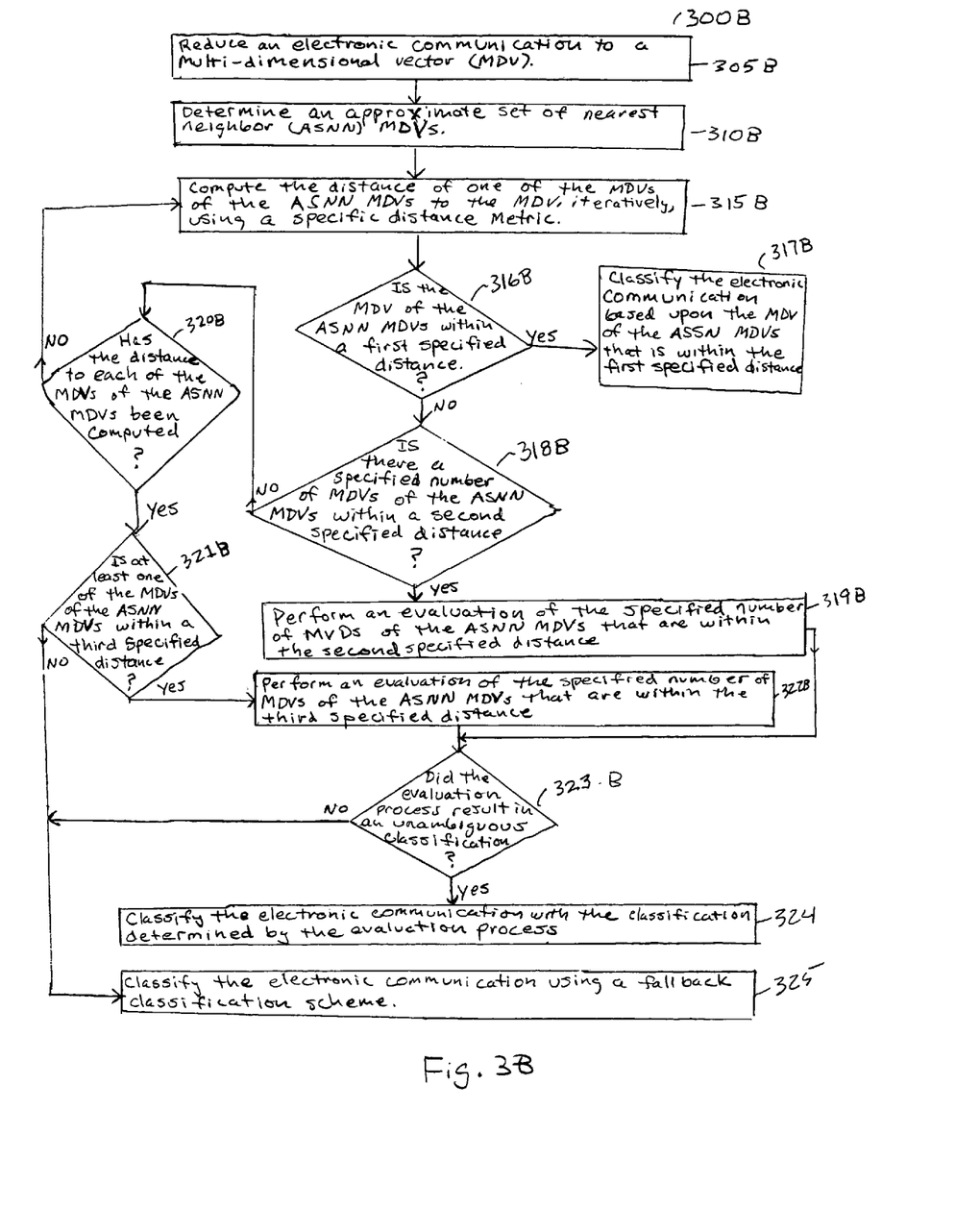
FIG. 3B illustrates a process in which an electronic communication is classified in accordance with an alternative embodiment of the invention.

FIG. 3B illustrates a process in which an electronic communication is classified in accordance with an alternative embodiment of the invention. Process 300B, shown in FIG. 3B, begins at operation 305B, in which an SEC is reduced to an MDV based upon the MDV space as described above in reference to operation 305A of process 300A.

At operation 310B, an ASNN MDVs is determined as described above in reference to operation 310A of process 300A.

At operation 315B, the distance between the subject MDV and one of the MDVs of the ASNN MDVs is computed. As each distance between each of the MDVs of the approximate set of KNNs and the subject MDV is computed, an evaluation is made at operation 316B to determine if the particular MDV of the approximate set of KNNs was within a first specified distance. The first specified distance is selected so that if an MDV of the ASNN MDVs is within the first specified distance, this would indicate a high degree of confidence in the particular MDV. Therefore, if the MDV of the ASNN MDVs is within the first specified distance, the electronic communication is classified based on the MDV of the ASNN MDVs that is within the first specified distance at operation 317B.

If at operation 316B, it is determined that the MDV is not within a first specified distance of the subject MDV then a determination is made at operation 318B as to whether a specified number of MDVs of the ASNN MDVs are within a second specified distance of the subject MDV. If so, an evaluation of the specified number of MDVs of the ASNN MDVs that are within the second specified distance is performed at operation 319B. For example, a vote is conducted among the specified number of MDVs of the ASNN MDVs that are within the second specified distance. This second specified distance is selected so as to provide confidence in an evaluation based upon a specified number of MDVs within the second specified distance. That is, it can be assumed with confidence that, if the calculation of the distances between the subject MDV and the remaining MDVs of the ASNN MDVs were continued, the MDVs within the specified second distance would be the nearest neighbors or at least that an evaluation based upon these MDVs would result in the same classification as an evaluation based upon the KNN MDVs.

At operation 323B a determination is made as to whether the evaluation process of operation 319B results in an unambiguous classification. If so, the electronic document is classified with the classification determined by the evaluation process of operation 319B. If at operation 323B it is determined that the evaluation process of operation 319B does not result in an unambiguous classification, then the electronic document is classified using a fallback classification scheme at operation 325B.

If, at operation 318B, it is determined that there is not a specified number of MDVs of the ASNN MDVs that are within a second specified distance of the subject MDV, then a determination is made at operation 320B as to whether the distance between the subject MDV and each of the ASNN MDVs has been computed. If not, the distance between another of the MDVs of the ASNN MDVs and the subject MDV is computed at operation 315B and the process continues as described above.

If, at operation 320B, the distance between the subject MDV and each of the ASNN MDVs has been computed, then a determination is made at operation 321B as to whether at least one of the MDVs of the ASNN MDVs are within a third specified distance of the subject MDV. If not, this indicates a lack of confidence in basing a classification of the electronic communication on an evaluation of the nearest neighbors of the subject MDV, and the electronic communication is classified using a fallback classification scheme at operation 325B.

If, at operation 3211B, it is determined that one or more of the MDVs of the ASNN MDVs are within a third specified distance of the subject MDV, then an evaluation of the specified number of MDVs of the ASNN MDVs that are within the third specified distance is performed at operation 322B.

At operation 323B, a determination is made as to whether the evaluation process of operation 322B results in an unambiguous classification. If so, the electronic document is classified with the classification determined by the evaluation process of operation 322B. If at operation 323B it is determined that the evaluation process of operation 322B does not result in an unambiguous classification, then the electronic document is classified using a fallback classification scheme at operation 325B.

Thus, alternative embodiments of the invention provide mechanisms to expedite the classification process in view of heightened confidence in the classification result, or fallback to conventional schemes in view of insufficient confidence in the classification result.

For alternative embodiments of the invention, a more complex fallback process may be implemented. That is, fallback schemes may be employed that require a higher level of confidence in classifying an electronic communication as spam. This helps to prevent an erroneous classification of a legit e-mail as spam e-mail.

For one such embodiment, the KNNs of the subject MDV are determined. Any of the KNNs that are farther away than a specified distance are excluded. For those KNNs that are not so excluded, the number of spam votes and legit votes are tallied (this could be zero votes, if none of the KNNs are within the specified distance). A classification is made only if the number of votes for one classification (e.g., spam e-mail) receives a specified majority of the total number of votes and the total number of votes exceeds a specified threshold. For one embodiment of the invention, the specified majority is much greater than 50% (e.g., 85%). For example, assuming that the majority threshold is 85%, and the vote threshold is 0.8, and the vote tally of the non-excluded KNNs is as follows.

1. Spam, 0.26 votes
2. Spam, 0.26 votes
3. Spam, 0.26 votes

Although all of the KNNs are above the threshold and 100% of the votes are spam votes, the subject MDV is not classified as spam e-mail because the total number of votes is 0.78 (below the threshold for classification is 0.8).

As another example, using the same classification criteria, and assuming the vote tally of the non-excluded KNNs is as follows.
1. Spam, 0.8 votes
2. Spam, 0.7 votes
3. Legit, 0.3 votes The subject MDV is not classified as spam e-mail because only 83.3% of the votes are spam votes (i.e., below the specified majority of 85%).

User-Specific Classifications

For one embodiment of the invention, user-specific preferences are specified. For such an embodiment, user-specific classifications are attached to the same MDV to enable user-specific preferences. For example, each MDV may have a default classification that applies to all users, and one or more other classifications that apply to particular users or groups of users whose opinions differ from the community of users overall. Vote tallying during the classification process uses the most specific classification that applies for the particular user (e.g., recipient of the email). For example, if an MDV has a classification specific to a particular user, then that classification is used for that user. If not, if the MDV has a classification that applies for a particular group of which the user is a member, then that classification is used. For example, the user may be a specific classification that applies to the "Engineering" group and the user may be a member of that group. If a user-specific or group-specific classification does not apply for to the MDV, then the default classification (applicable to all users) is used.

System

Figure 4:
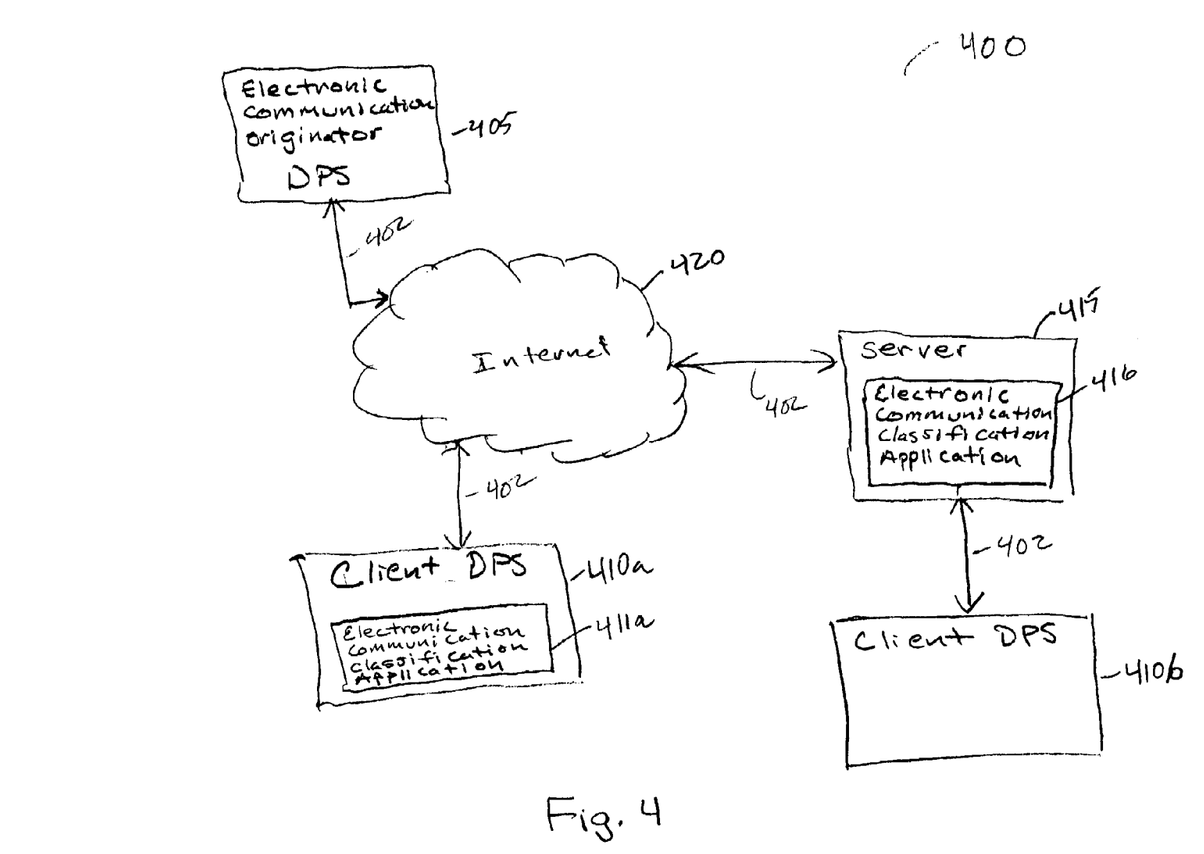
FIG. 4 illustrates a system for receiving and classifying electronic communications in accordance with one embodiment of the invention.

Embodiments of the invention may be implemented in a network environment. FIG. 4 illustrates a system for receiving and classifying electronic communications in accordance with one embodiment of the invention. System 400, shown in FIG. 4, illustrates a network of digital processing systems (DPSs) that may include a DPS 405 that originates and communicates electronic communication, and one or more client DPSs 410a and 410b that receive the electronic communications. System 400 may also include one or more server DPSs, shown as server DPS 415, through which electronic communications may be communicated.

The DPSs of system 400 are coupled one to another and are configured to communicate a plurality of various types of electronic communications or other stored content including documents such as web pages, content stored on web pages, including text, graphics, and audio and video content. For example, the stored content may be audio/video files, such as programs with moving images and sound. Information may be communicated between the DPSs through any type of communications network through which a plurality of different devices may communicate such as, for example, but not limited to, the Internet, a wide area network (WAN) not shown, a local area network (LAN), an intranet, or the like. For example, as shown in FIG. 4, the DPSs are interconnected one to another through Internet 420 which is a network of networks having a method of communicating that is well known to those skilled in the art. The communication links 402 coupling the DPSs need not be a direct link, but may be indirect links, including but not limited to, broadcasted wireless signals, network communications or the like. While exemplary DPSs are shown in FIG. 4, it is understood that many such DPS are interconnected.

In accordance with one embodiment of the invention, an electronic communication is originated at DPS 405 and communicated via internet 420 to DPS 410a. The electronic communication classification application (ECCA) 411a classifies the electronic communication in accordance with an embodiment of the invention as described above. For example, the electronic communication may be an e-mail message and may be classified as either spam e-mail or legit e-mail.

For an alternative embodiment, the electronic communication is originated at DPS 405 and communicated via internet 420 and server DPS 415 to client DPS 410b. The ECCA 416 classifies the electronic communication in accordance with an embodiment of the invention as described above. For one embodiment, if the ECCA 416 classifies the electronic communication as spam, the electronic communication is not communicated to client DPS 410b. For an alternative embodiment, if the ECCA 416 classifies the electronic communication as spam, the electronic communication is designated as such prior to communication to DPS 410b.

Updating the MDV Space

Embodiments of the invention provide the capability of learning to classify new types of electronic communication on-the-fly. This allows the MDV space of the system, in accordance with one embodiment, to be updated (trained) at the client DPS (e.g., at the user's mail server). Such on-the-fly updating of the MDV space allows the user to mimic a mini training system, thus improving the classification system for the particular installation.

For example, a particular electronic communication may have no similar MDVs in the defined MDV space, rendering it difficult to classify in accordance with an embodiment of the invention. A particular user may know the classification of the electronic communication (at least in regards to that particular user). For example, if the electronic communication is known by the user to be an e-mail spam, the user may classify it as such and add a corresponding MDV to the MDV space. This is in contrast to prior art classification schemes that typically require re-computation of probabilities throughout the system when new data was added.

In addition, embodiments of the invention recall previous classifications, that is, an attempt to classify a document that has already been added to the vector space will always return the classification of that document. This is not always true for prior art systems (e.g., heuristic or bayesian systems) where the overall trend for all documents often overwhelms a particular instance (e.g., a legitimate email containing a word typical in spam e-mails).

Embodiments of the invention allow for the incremental adaptation of the MDV space by adding and removing points from the MDV space as needed. This allows on-going retraining and tailoring for classification of typical electronic communications of a particular user, and allows for recall to correct false classifications.

For example, if a particular point in the MDV space is very infrequently or never used as a k-nearest-neighbor, it is an uncommon, unrepresentative document that can safely be removed from the MDV space. This speeds up the classification process by allowing the classification system to ignore such documents.

Runtime Feature Extraction

As discussed above, embodiments of the invention allow for the MDV space to be updated on the fly with new MDVs, thus, allowing "online learning" while doing classification. For one embodiment of the invention, we can also perform runtime feature extraction, allowing the incremental addition of new features, on the fly, thus increasing the precision of the MDV space.

For one embodiment of the invention, the runtime feature extraction is implemented inline (i.e., as messages are processed). For example, for one embodiment of the invention, a copy of all feedback messages is saved and the training process described above in reference to FIG. 1 is periodically repeated on those documents, replacing any existing MDVs as necessary. For one such embodiment, a copy of the most recent N (e.g., 1000) e-mails, corresponding to user feedback MDVs is stored. The inline feature extraction mimics the initial training process, as described above, in regard to the stored e-mails. When a feature is present in a threshold amount (e.g., 1%) of the stored e-mails, that feature is used in defining the MDV space. Additionally, all of the most recent e-mails are reduced to MDVs using the new and existing features and are added to the MDV space, replacing any existing MDVs corresponding to the stored e-mails.

General Matters

Embodiments of the invention provide methods and apparatuses for classifying electronic communication. Although the classifications/categories for various embodiments of the invention have been discussed in terms of spam e-mails and legit e-mails, embodiments of the invention are equally applicable for discerning other classifications and more than two distinct classifications.

Embodiments of the invention provide many advantages over conventional prior art schemes as will be apparent to those skilled in the art. In addition to those advantages discussed above, embodiments of the invention provide other advantages including on-the-fly updating, dimension scaling, and run-time feature extraction, among others. Particular advantages will be discussed in greater detail below.

The invention includes various operations. Many of the methods are described in their most basic form, but operations can be added to or deleted from any of the methods without departing from the basic scope of the invention. The operations of the invention may be performed by hardware components or may be embodied in machine-executable instructions as described above. Alternatively, the steps may be performed by a combination of hardware and software. The invention may be provided as a computer program product that may include a machine-readable medium having stored thereon instructions, which may be used to program a computer (or other electronic devices) to perform a process according to the invention as described above.

Figure 5:
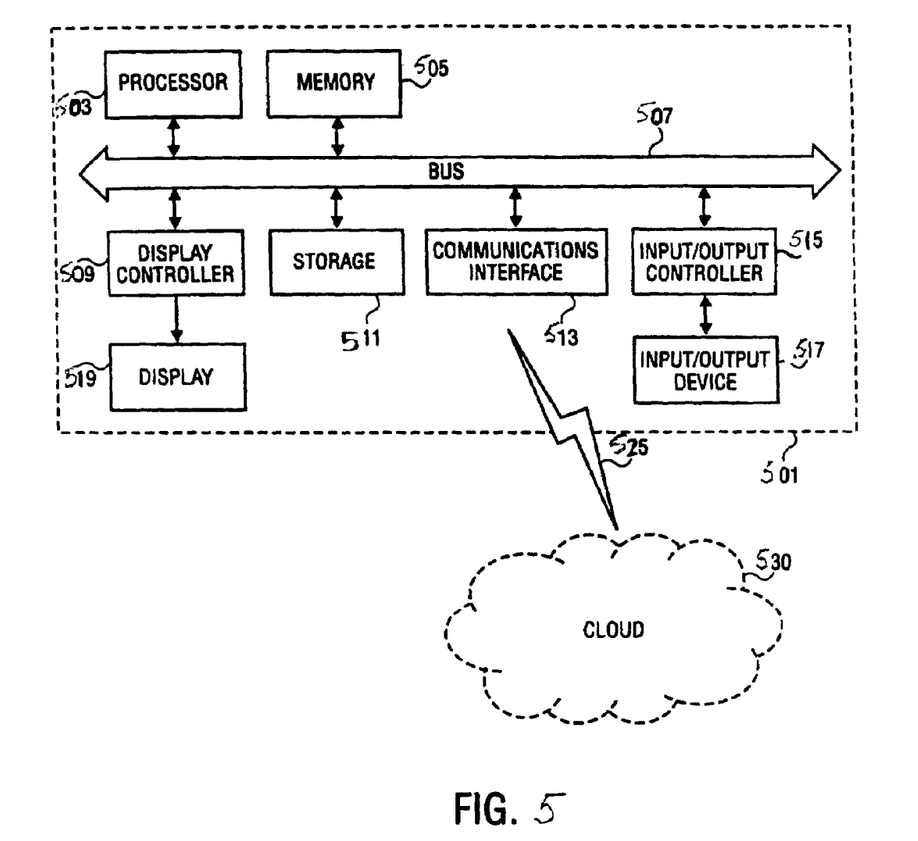
FIG. 5 illustrates an embodiment of a digital processing system that may be used in accordance with one embodiment of the invention.

FIG. 5 illustrates an embodiment of a digital processing system that may be used for the DPSs described above in reference to FIG. 4, in accordance with an embodiment of the invention. For alternative embodiments of the present invention, processing system 501 may be a computer or a set top box that includes a processor 503 coupled to a bus 507. In one embodiment, memory 505, storage 511, display controller 509, communications interface 513, and input/output controller 515 are also coupled to bus 507.

Processing system 501 interfaces to external systems through communications interface 513. Communications interface 513 may include an analog modem, Integrated Services Digital Network (ISDN) modem, cable modem, Digital Subscriber Line (DSL) modem, a T-1 line interface, a T-3 line interface, an optical carrier interface (e.g. OC-3), token ring interface, satellite transmission interface, a wireless interface or other interfaces for coupling a device to other devices. Communications interface 513 may also include a radio transceiver or wireless telephone signals, or the like.

For one embodiment of the present invention, communication signal 525 is received/transmitted between communications interface 513 and the cloud 530. In one embodiment of the present invention, a communication signal 525 may be used to interface processing system 501 with another computer system, a network hub, router, or the like. In one embodiment of the present invention, communication signal 525 is considered to be machine readable media, which may be transmitted through wires, cables, optical fibers or through the atmosphere, or the like.

In one embodiment of the present invention, processor 503 may be a conventional microprocessor, such as, for example, but not limited to, an Intel Pentium family microprocessor, a Motorola family microprocessor, or the like. Memory 505 may be a machine-readable medium such as dynamic random access memory (DRAM) and may include static random access memory (SRAM). Display controller 509 controls, in a conventional manner, a display 519, which in one embodiment of the invention may be a cathode ray tube (CRT), a liquid crystal display (LCD), an active matrix display, a television monitor, or the like. The input/output device 517 coupled to input/output controller 515 may be a keyboard, disk drive, printer, scanner and other input and output devices, including a mouse, trackball, trackpad, or the like.

Storage 511 may include machine-readable media such as, for example, but not limited to, a magnetic hard disk, a floppy disk, an optical disk, a smart card or another form of storage for data. In one embodiment of the present invention, storage 511 may include removable media, read-only media, readable/writable media, or the like. Some of the data may be written by a direct memory access process into memory 505 during execution of software in computer system 501. It is appreciated that software may reside in storage 511, memory 505 or may be transmitted or received via modem or communications interface 513. For the purposes of the specification, the term "machine readable medium" shall be taken to include any medium that is capable of storing data, information or encoding a sequence of instructions for execution by processor 503 to cause processor 503 to perform the methodologies of the present invention. The term "machine readable medium" shall be taken to include, but is not limited to, solid-state memories, optical and magnetic disks, carrier wave signals, and the like.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:

defining a multi-dimensional vector space, the definition based upon a knowledge of a classification;

populating the multi-dimensional vector space with at least one known vector associated with an at least one feature that includes a feature weighting based on a differentiation capacity of the at least one feature, the differentiation capacity indicating whether the at least one feature occurs predominately in spam or non-spam electronic documents;

reducing an electronic document to a corresponding multi-dimensional vector based upon the multi-dimensional vector space;

classifying the electronic document as being a spam or a non-spam electronic document in regard to the populated multi-dimensional vector space, based on a distance between the corresponding multi-dimensional vector and the at least one vector, wherein the distance is based on the feature weighting; and outputting the electronic document to a receiver based on classifying the electronic document as being spam or non-spam.

2. The method of claim 1 wherein classifying the electronic document further comprises: determining a set of nearest neighbor multi-dimensional vectors of the corresponding multi-dimensional vector; computing the distance between the corresponding multi-dimensional vector and each nearest neighbor multi-dimensional vector of the set of nearest neighbor multi-dimensional vectors using a distance metric; and classifying the corresponding electronic document based upon a proximity of the corresponding multi-dimensional vector to each of the nearest neighbor multi-dimensional vectors.

3. The method of claim 2 wherein specific distance metric is a cosine similarity distance metric.

4. The method of claim 2 wherein the distance metric is selected from the group of distance metrics comprising of a non-zero dimension proportionality distance metric, a Manhattan distance metric, a Euclidean distance metric, and a cosine similarity distance metric.

5. The method of claim 2 wherein the electronic document is classified using a fallback classification scheme upon a determination that classification based upon the proximity of the corresponding multi-dimensional vector to each of the nearest neighbor multi-dimensional vectors is indeterminate.

6. The method of claim 5 further comprising:
prior to classifying the corresponding electronic document based upon a proximity of the corresponding multi-dimensional vector to each of the nearest neighbor multi-dimensional vectors, further operations are effected, the further operations comprising:
comparing the distance between the corresponding multi-dimensional vector and each of the nearest neighbor multi-dimensional vectors, respectively, to a specified distance; and
classifying the electronic communication using the fallback classification scheme upon determination that the distance between the corresponding multi-dimensional vector and each of the nearest neighbor multi-dimensional vectors is greater than the specified distance.

7. The method of claim 5 wherein each of the nearest neighbor multi-dimensional vectors receives a weighted vote based upon the proximity of the corresponding multi-dimensional vector to each of the nearest neighbor multi-dimensional vectors and a vote based upon the each weighted vote is ambiguous.

8. The method of claim 5 wherein the fallback classification scheme is a classification scheme selected from the group comprising of Bayesian classifiers, and heuristic classifiers.

9. The method of claim 2 further comprising:
during the operation of computing the distance between the corresponding multi-dimensional vector and each nearest neighbor multi-dimensional vector of the set of nearest neighbor multi-dimensional vectors using a distance metric, further operations are effected, the further operations comprising:
comparing each distance upon computation to a specified distance;
terminating the operation of computing the distance between the corresponding multi-dimensional vector and each of the multi-dimensional vectors of the set of nearest neighbor multi-dimensional vectors upon determination that a specified number of distances are within the specified distance, thus creating a terminating set; and
classifying the electronic document based upon an evaluation of classification of the multi-dimensional vectors of the terminating set.

10. The method of claim 9 wherein terminating is based upon the first multi-dimensional vectors of the set of nearest neighbor multi-dimensional vectors that is within the specified distance.

11. The method of claim 2 wherein determining a set of nearest neighbor multi-dimensional vectors of the corresponding multi-dimensional vector further comprises:
selecting a number of leader vectors from within the multi-dimensional vector space;
computing the proximity of non-leader vectors to leader vectors;
assigning each of the non-leader vectors to the nearest leader vector;
determining a most proximate leader vector to the corresponding multi-dimensional vector; and
designating the nearest leader vector and all associated non-leader vectors as the set of nearest neighbor multi-dimensional vectors.

12. The method of claim 1 wherein classifying the corresponding electronic document based upon a proximity of the corresponding multi-dimensional vector to each of the nearest neighbor multi-dimensional vectors includes using a vote-based evaluation of the nearest neighbor multi-dimensional vectors.

13. The method of claim 12 wherein each of the nearest neighbor multi-dimensional vectors receives a weighted vote based upon the proximity of the corresponding multi-dimensional vector to each of the nearest neighbor multi-dimensional vectors.

14. The method of claim 1 wherein multi-dimensional vector space grows by adding dimensions to the multi-dimensional vector space.

15. The method of claim 1 wherein the wherein multi-dimensional vector space is populated with a number of multi-dimensional vectors each corresponding classified electronic document of a classified corpus of electronic documents.

16. The method of claim 15 wherein the electronic documents are electronic communications.

17. The method of claim 16 wherein the electronic communications are e-mail.

18. The method of claim 1 wherein the electronic document is classified as either spam or legitimate.

19. The method of claim 1 wherein each of the at least one feature is selected based upon an ability of the feature to categorize.

20. The method of claim 19 wherein the at least one feature is based upon criteria selected from the group consisting of selected words, selected phrases, algorithms, phone numbers, and URLs.

21. The method of claim 19 wherein the at least one feature is derived from a corpus of classified electronic documents.

22. The method of claim 1 wherein the electronic document is reduced to a corresponding multi-dimensional vector based upon an occurrence and frequency of the at least one feature.

23. The method of claim 1 wherein the feature weighting is based upon a rarity of occurrence in the multi-dimensional vector space.

24. The method of claim 1 wherein the feature weighting is based upon an occurrence in particular category and non-occurrence in at least one other category.

25. The method of claim 1 wherein the electronic document is an electronic communication.

26. The method of claim 25 wherein the electronic communication is an e-mail.

27. The method of claim 1 wherein the multi-dimensional vector space grows dynamically.

28. The method of claim 27 wherein multi-dimensional vector space grows by adding known vectors to the multi-dimensional vector space.

29. A machine-readable medium having stored thereon a set of instructions which when executed cause a system to perform a method comprising:
   defining a multi-dimensional vector space, the definition based upon a knowledge of a classification;
   populating the multi-dimensional vector space with at least one known vector associated with an at least one feature that includes a feature weighting based on a differentiation capacity of the at least one feature, the differentiation capacity indicating whether the at least one feature occurs predominately in spam or non-spam electronic documents;
   reducing an electronic document to a corresponding multi-dimensional vector based upon the multi-dimensional vector space;
   classifying the electronic document as being a spam or a non-spam electronic document in regard to the populated multi-dimensional vector space, based on a distance between the corresponding multi-dimensional vector and the at least one vector, wherein the distance is based on the feature weighting; and
   outputting the electronic document to a receiver based on classifying the electronic document as being spam or non-spam.

30. The machine-readable medium of claim 29 wherein classifying the electronic document further comprises:
   determining a set of nearest neighbor multi-dimensional vectors of the corresponding multi-dimensional vectors;
   computing the distance between the corresponding multi-dimensional vector and each nearest neighbor multi-dimensional vector of the set of nearest neighbor multi-dimensional vectors using a distance metric; and
   classifying the corresponding electronic document based upon a proximity of the corresponding multi-dimensional vector to each of the nearest neighbor multi-dimensional vectors.

31. The machine-readable medium of claim 30 wherein specific distance metric is a cosine similarity distance metric.

32. The machine-readable medium of claim 30 wherein the distance metric is selected from the group of distance metrics comprising of a non-zero dimension proportionality distance metric, a Manhattan distance metric, a Euclidean distance metric, and a cosine similarity distance metric.

33. The machine-readable medium of claim 30 wherein the electronic document is classified using a fallback classification scheme upon a determination that classification based upon the proximity of the corresponding multi-dimensional vector to each of the nearest neighbor multi-dimensional vectors is indeterminate.

34. The machine-readable medium of claim 33 further comprising prior to classifying the corresponding electronic document based upon a proximity of the corresponding multi-dimensional vector to each of the nearest neighbor multi-dimensional vectors, further operations are effected, the further operations comprising:
   comparing the distance between the corresponding multi-dimensional vector and each of the nearest neighbor multi-dimensional vectors, respectively, to a specified distance; and
   classifying electronic documents classifying the electronic communication using the fallback classification scheme upon determination that the distance between the corresponding multi-dimensional vector and each of the nearest neighbor multi-dimensional vectors is greater than the specified distance.

35. The machine-readable medium of claim 33 wherein each of the nearest neighbor multi-dimensional vectors receives a weighted vote based upon the proximity of the corresponding multi-dimensional vector to each of the nearest neighbor multi-dimensional vectors and a vote based upon the each weighted vote is ambiguous.

36. The machine-readable medium of claim 33 wherein the fallback classification scheme is a classification scheme selected from the group comprising of Bayesian classifiers, and heuristic classifiers.

37. The machine-readable medium of claim 30 further comprising:
   during the operation of computing the distance between the corresponding multi-dimensional vector and each nearest neighbor multi-dimensional vector of the set of nearest neighbor multi-dimensional vectors using a distance metric, further operations are effected, the further operations comprising:
   comparing each distance upon computation to a specified distance;
   terminating the operation of computing the distance between the corresponding multi-dimensional vector and each of the multi-dimensional vectors of the set of nearest neighbor multi-dimensional vectors upon determination that a specified number of distances are within the specified distance, thus creating a terminating set; and
   classifying the electronic document based upon an evaluation of classification of the multi-dimensional vectors of the terminating set.

38. The machine-readable medium of claim 37 wherein terminating is based upon the first multi-dimensional vectors of the set of nearest neighbor multi-dimensional vectors that is within the specified distance.

39. The machine-readable medium of claim 37 wherein each of the at least one feature is selected based upon an ability of the feature to categorize.

40. The machine-readable medium of claim 39 wherein the at least one feature is based upon criteria selected from the group consisting of selected words, selected phrases, algorithms, phone numbers, and URLs.

41. The machine-readable medium of claim 39 wherein the at least one feature is derived from a corpus of classified electronic documents.

42. The machine-readable medium of claim 37 wherein the electronic document is reduced to a corresponding multi-dimensional vector based upon an occurrence and frequency of the at least one feature.

43. The machine-readable medium of claim 37 wherein the feature weighting is based upon a rarity of occurrence in the multi-dimensional vector space.

44. The machine-readable medium of claim 37 wherein the feature weighting is based upon an occurrence in particular category and nonoccurrence in at least one other category.

45. The machine-readable medium of claim 30 wherein determining a set of nearest neighbor multi-dimensional vectors of the corresponding multi-dimensional vector comprises:
   selecting a number of leader vectors from within the multi-dimensional vector space;
   computing the proximity of non-leader vectors to leader vectors;
   assigning each of the non-leader vectors to the nearest leader vector;

determining a most proximate leader vector to the corresponding multi-dimensional vector; and designating the nearest leader vector and all associated non-leader vectors as the set of nearest neighbor multi-dimensional vectors.

46. The machine-readable medium of claim 29 wherein classifying the corresponding electronic document based upon a proximity of the corresponding dimensional vector to each of the nearest neighbor multidimensional vectors comprises using a vote-based evaluation of the nearest neighbor multi-dimensional vectors.

47. The machine-readable medium of claim 46 wherein each of the nearest neighbor multi-dimensional vectors receives a weighted vote based upon the proximity of the corresponding multi-dimensional vector to each of the nearest neighbor multi-dimensional vectors.

48. The machine-readable medium of claim 29 wherein multi-dimensional vector space grows by adding dimensions to the multi-dimensional vector space.

49. The machine-readable medium of claim 29 wherein the wherein multi-dimensional vector space is populated with a number of multi-dimensional vectors each corresponding classified electronic document of a classified corpus of electronic documents.

50. The machine-readable medium of claim 49 wherein the electronic documents are electronic communications.

51. The machine-readable medium of claim 50 wherein the electronic communications are e-mail.

52. The machine-readable medium of claim 29 wherein the electronic document is classified as either spam or legitimate.

53. The machine-readable medium of claim 29 wherein the electronic document is an electronic communication.

54. The machine-readable medium of claim 53 wherein the electronic communication is an e-mail.

55. The machine-readable medium of claim 29 wherein the multi-dimensional vector space grows dynamically.

56. The machine-readable medium of claim 55 wherein multi-dimensional vector space grows by adding known vectors to the multi-dimensional vector space.

57. A system comprising:
a processor;
a network interface coupled to the processor; and
a machine-readable medium having stored thereon a set of instructions which when executed cause the system to perform a method comprising:
defining a multi-dimensional vector space, the definition based upon a knowledge of a classification;
populating the multi-dimensional vector space with at least one known vector associated with an at least one feature that includes a feature weighting based on a differentiation capacity of the at least one feature, the differentiation capacity indicating whether the at least one feature occurs predominately in spam or non-spam electronic documents;
reducing an electronic document to a corresponding multi-dimensional vector based upon the multi-dimensional vector space;
classifying the electronic document as being a spam or a non-spam electronic document in regard to the populated multi-dimensional vector space, based on a distance between the corresponding multi-dimensional vector and the at least one vector, wherein the distance is based on the feature weighting; and
outputting the electronic document to a receiver based on classifying the electronic document as being spam or non-spam.

58. The system of claim 57 wherein classifying the electronic document further comprises:
determining a set of nearest neighbor multi-dimensional vectors of the corresponding multi-dimensional vectors;
computing the distance between the corresponding multi-dimensional vector and each nearest neighbor multi-dimensional vector of the set of nearest neighbor multi-dimensional vectors using a distance metric; and
classifying the corresponding electronic document based upon a proximity of the corresponding multi-dimensional vector to each of the nearest neighbor multi-dimensional vectors.

59. The system of claim 58 wherein specific distance metric is a cosine similarity distance metric.

60. The system of claim 58 wherein the distance metric is selected from the group of distance metrics comprising of a non-zero dimension proportionality distance metric, a Manhattan distance metric, a Euclidean distance metric, and a cosine similarity distance metric.

61. The system of claim 58 wherein the electronic document is classified using a fallback classification scheme upon a determination that classification based upon the proximity of the corresponding multi-dimensional vector to each of the nearest neighbor multi-dimensional vectors is indeterminate.

62. The system of claim 61 further comprising:
prior to classifying the corresponding electronic document based upon a proximity of the corresponding multi-dimensional vector to each of the nearest neighbor multi-dimensional vectors, further operations are effected, the further operations comprising:
comparing the distance between the corresponding multi-dimensional vector and each of the nearest neighbor multi-dimensional vectors, respectively, to a specified distance; and
classifying the electronic communication using the fallback classification scheme upon determination that the distance between the corresponding multi-dimensional vector and each of the nearest neighbor multi-dimensional vectors is greater than the specified distance.

63. The system of claim 61 wherein each of the nearest neighbor multi-dimensional vectors receives a weighted vote based upon the proximity of the corresponding multi-dimensional vector to each of the nearest neighbor multi-dimensional vectors and a vote based upon the each weighted vote is ambiguous.

64. The system of claim 61 wherein the fallback classification scheme is a classification scheme selected from the group comprising of Bayesian classifiers, and heuristic classifiers.

65. The system of claim 58 further comprising:
during the operation of computing the distance between the corresponding multi-dimensional vector and each nearest neighbor multi-dimensional vector of the set of nearest neighbor multi-dimensional vectors using a distance metric, further operations are effected, the further operations comprising:
comparing each distance upon computation to a specified distance;
terminating the operation of computing the distance between the corresponding multi-dimensional vector and each of the multi-dimensional vectors of the set of nearest neighbor multi-dimensional vectors upon determination that a specified number of distances are within the specified distance, thus creating a terminating set; and classifying electronic documents classifying the electronic document based upon an evaluation of classification of the multi-dimensional vectors of the terminating set.

66. The system of claim 65 wherein terminating is based upon the first multi-dimensional vectors of the set of nearest neighbor multi-dimensional vectors that is within the specified distance.

67. The system of claim 58 wherein determining a set of nearest neighbor multi-dimensional vectors of the corresponding multi-dimensional vectors further comprises:
    selecting a number of leader vectors from within the multi-dimensional vector space;
    computing the proximity of non-leader vectors to leader vectors;
    assigning each of the non-leader vectors to the nearest leader vector;
    determining a most proximate leader vector to the corresponding multi- dimensional vector; and
    designating the nearest leader vector and all associated non-leader vectors as the set of nearest neighbor multi-dimensional vectors.

68. The system of claim 57 wherein classifying the corresponding electronic document based upon a proximity of the corresponding multi-dimensional vector to each of the nearest neighbor multi-dimensional vectors includes using a vote-based evaluation of the nearest neighbor multidimensional vectors.

69. The system of claim 68 wherein each of the nearest neighbor multi-dimensional vectors receives a weighted vote based upon the proximity of the corresponding multi-dimensional vector to each of the nearest neighbor multi-dimensional vectors.

70. The system of claim 57 wherein multi-dimensional vector space grows by adding dimensions to the multi-dimensional vector space.

71. The system of claim 57 wherein the wherein multidimensional vector space is populated with a number of multi-dimensional vectors each corresponding classified electronic document of a classified corpus of electronic documents.

72. The system of claim 71 wherein the electronic documents are electronic communications.

73. The system of claim 72 wherein the electronic communications are e-mail.

74. The system of claim 57 wherein the electronic document is classified as either spam or legitimate.

75. The system of claim 57 wherein each of the at least one feature is selected based upon an ability of the feature to categorize.

76. The system of claim 75 wherein the at least one feature is based upon criteria selected from the group comprising of selected words, selected phrases, algorithms, phone numbers, and URLs.

77. The system of claim 75 wherein the at least one feature is derived from a corpus of classified electronic documents.

78. The system of claim 57 wherein the electronic document is reduced to a corresponding multi-dimensional vector based upon an occurrence and frequency of the at least one feature.

79. The system of claim 57 wherein the feature weighting is based upon a rarity o1" occurrence in the multi-dimensional vector space.

80. The system of claim 57 wherein the feature weighting is based upon an occurrence in particular category and non-occurrence in at least one other category.

81. The system of claim 57 wherein the electronic document is an electronic communication.

82. The system of claim 81 wherein the electronic communication is an e-mail.

83. The system of claim 57 wherein the multi-dimensional vector space grows dynamically.

84. The system of claim 83 wherein multi-dimensional vector space grows by adding known vectors to the multi-dimensional vector space.

* * * * *